US012761746B2

(12) United States Patent
Kurasawa et al.

(10) Patent No.: US 12,761,746 B2

(45) **Date of Patent: *Oct. 13, 2026**

(54) SENSOR DEVICE

(71) Applicant: Magnolia White Corporation, Tokyo (JP)

(72) Inventors: Hayato Kurasawa, Tokyo (JP); Toshihiko Tanaka, Tokyo (JP); Naoki Takada, Tokyo (JP); Chihiro Tanaka, Tokyo (JP); Koji Ishizaki, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/821,190

(22) Filed: Aug. 30, 2024

(65) Prior Publication Data

US 2024/0419276 A1 Dec. 19, 2024

Related U.S. Application Data

(63) Continuation of application No. 18/195,511, filed on May 10, 2023, now Pat. No. 12,079,409, which is a continuation of application No. 17/940,169, filed on Sep. 8, 2022, now Pat. No. 11,669,187, which is a continuation of application No. 17/328,409, filed on May 24, 2021, now Pat. No. 11,442,568, which is a continuation of application No. 16/590,901, filed on Oct. 2, 2019, now Pat. No. 11,016,593, which is a continuation of application No. 16/207,601, filed on Dec. 3, 2018, now Pat. No. 10,466,825, which is a (Continued)

(30) Foreign Application Priority Data

Sep. 18, 2015 (JP) ................................ 2015-185395

(51) Int. Cl.

| | |
|---|---|
| ***G06F 3/041*** | (2006.01) |
| ***G02F 1/133*** | (2006.01) |
| ***G02F 1/1333*** | (2006.01) |
| ***G02F 1/1343*** | (2006.01) |
| ***G06F 3/044*** | (2006.01) |

(52) U.S. Cl.

CPC ............ *G06F 3/0412* (2013.01); *G02F 1/133* (2013.01); *G02F 1/13338* (2013.01); *G02F 1/1343* (2013.01); *G06F 3/04164* (2019.05); *G06F 3/0445* (2019.05); *G06F 3/0446* (2019.05)

(58) Field of Classification Search

CPC .... G02F 1/133; G02F 1/13338; G02F 1/1343; G06F 3/0412; G06F 3/04164; G06F 3/0445; G06F 3/0446

See application file for complete search history.

(56) References Cited

U.S. PATENT DOCUMENTS

| | | | | |
|---|---|---|---|---|
| 2013/0063371 A1* | 3/2013 | Lee | ...................... | G06F 3/0412 345/173 |
| 2014/0320760 A1* | 10/2014 | Ishizaki | ............. | G06F 3/04166 349/12 |

* cited by examiner

*Primary Examiner* — Insa Sadio

(74) *Attorney, Agent, or Firm* — K&L Gates LLP

(57) ABSTRACT

A sensor device is provided and includes electrodes each including first parts arranged in a first direction and a second part connected to the first parts, the first parts each having a first mesh shape which is formed of first metal wires, and the second part having a second mesh shape which is formed of second metal wires, wherein a longitudinal direction of the second part is the first direction, and at least one of the first mash shape and the second mash shape has an intersection portion at which two of the first metal wires or two of the second metal wires intersect.

20 Claims, 12 Drawing Sheets

Related U.S. Application Data continuation of application No. 15/266,099, filed on Sep. 15, 2016, now Pat. No. 10,175,795.

SENSOR DEVICE

CROSS-REFERENCE TO RELATED APPLICATIONS

This application is a continuation of U.S. application Ser. No. 18/195,511, filed on May 10, 2023, which application is a continuation of U.S. application Ser. No. 17/940,169, filed on Sep. 8, 2022, which application is a continuation of U.S. application Ser. No. 17/328,409, filed on May 24, 2021, and issued as U.S. Pat. No. 11,442,568 on Sep. 13, 2022, which application is a continuation of U.S. application Ser. No. 16/590,901, filed on Oct. 2, 2019, and issued as U.S. Pat. No. 11,016,593 on May 25, 2021, which application is a continuation of U.S. application Ser. No. 16/207,601, filed on Dec. 3, 2018, and issued as U.S. Pat. No. 10,466,825 on Nov. 5, 2019, which application is a continuation of U.S. patent application Ser. No. 15/266,099, filed on Sep. 15, 2016, and issued as U.S. Pat. No. 10,175,795 on Jan. 8, 2019, which application claims the benefit of priority from Japanese Patent Application No. 2015-185395, filed Sep. 18, 2015, the entire contents of which are incorporated herein by reference.

FIELD

Embodiments described herein relate generally to a sensor-equipped display device and a sensor device.

BACKGROUND

Recently, a sensor-equipped display device comprising a sensor (often called a touch panel) capable of detecting contact or approach of an object, has been put into practical use. As an example of the sensor, a capacitive sensor capable of detecting contact or approach of an object, based on a variation in electrostatic capacitance is well known. A detection electrode and a sensor driving electrode constituting the sensor are disposed in a display area in which images are displayed, and opposed to each other with a dielectric interposed between the electrodes. The detection electrode is electrically connected to a lead line located outside the display area.

Requests for downsizing of the display device are increased while the display area is extended, and a periphery outside the display area tends to become a narrow frame. For this reason, the sensor driving electrode and the lead line are often disposed closely to each other. In this case, the lead line may function as a sensor due to capacitive coupling between the sensor driving electrode and the lead line. For example, if an object which is to be detected contacts or approaches the vicinity of an outermost periphery of the display area, variation in the electrostatic capacitance of the lead line is detected. For this reason, the detection electrode connected to the lead line performs error detection as if the detection electrode detected the detected object at a position different from a position where the detection electrode should detect the detected object.

Thus, for example, a technology of disposing a grounded conductive material outside the display area between the sensor driving electrode and the outer peripheral line (lead line) and blocking the capacitive coupling between the sensor driving electrode and the outer peripheral line has been proposed.

SUMMARY

The present application generally relates to a sensor-equipped display device and a sensor device.

According to one embodiment, a sensor-equipped display device includes a display panel which includes a sensor driving electrode disposed in a display area for displaying an image, detection electrodes each including a body portion opposed to the sensor driving electrode in the display area and a broadened portion connected to the body portion and formed to be wider than the body portion, and a lead line disposed in a non-display area outside the display area and electrically connected to the broadened portion. The broadened portion is disposed in the non-display area without being overlaid on the display area in planar view.

Additional features and advantages are described herein, and will be apparent from the following Detailed Description and the figures.

DETAILED DESCRIPTION

Figure 1:
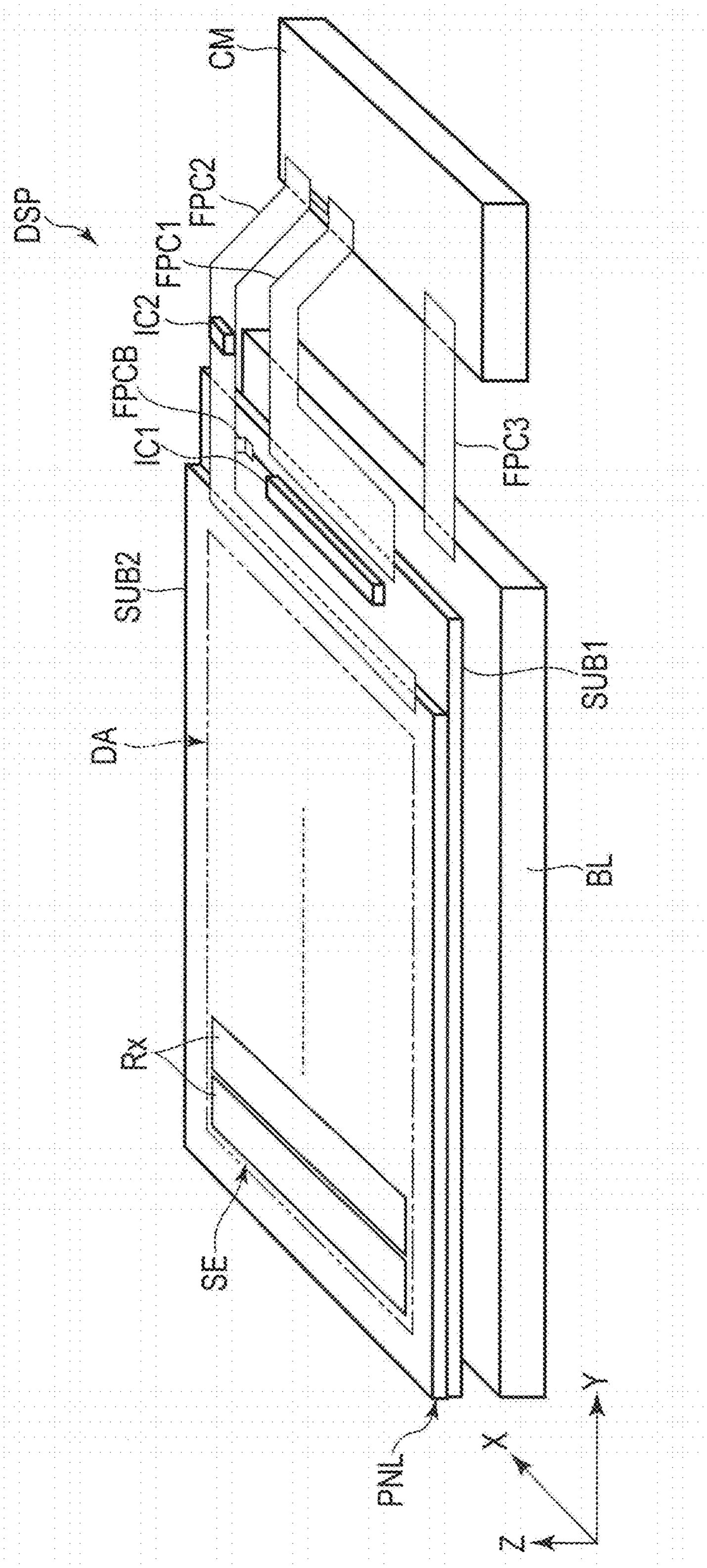
FIG. 1 is a perspective view schematically showing a configuration example of a sensor-equipped display device of one of embodiments.

In general, according to one embodiment, a sensor-equipped display device, includes: a display panel which includes a sensor driving electrode disposed in a display area for displaying an image, detection electrodes each including a body portion opposed to the sensor driving electrode in the display area and a broadened portion connected to the body portion and formed to be wider than the body portion, and a lead line disposed in a non-display area outside the display area and electrically connected to the broadened portion; and a driving module which supplies a sensor drive signal to the sensor driving electrode, allows the sensor drive signal from the sensor driving electrode to be detected as a detection signal by each of the detection electrodes, and reads variation of the detection signal via the lead line, the broadened portion being disposed in the non-display area without being overlaid on the display area in planar view.

According to another embodiment, a sensor device opposed to a display device including a display area for displaying an image and a non-display area outside the display area, the sensor device includes: a sensor driving electrode opposed to the display area; detection electrodes each including a body portion opposed to the sensor driving electrode and a broadened portion connected to the body portion and being wider than the body portion; a lead line opposed to the non-display area and electrically connected to the broadened portion; and a driving module which supplies a sensor drive signal to the sensor driving electrode, allows the sensor drive signal from the sensor driving electrode to be detected as a detection signal by each of the detection electrodes, and reads variation of the detection signal via the lead line, the broadened portion being opposed to the non-display area without being opposed to the display area.

According to yet another embodiment,
a sensor-equipped display device, includes: a sensor driving electrode disposed in an outermost periphery in a display area for displaying an image; detection electrodes each including a body portion opposed to the sensor driving electrode in the display area, and a broadened portion connected to the body portion and being wider than the body portion; and a lead line disposed in a non-display area outside the display area and electrically connected to the broadened portion, the broadened portion being disposed in the non-display area without being opposed to the sensor driving electrode.

According to yet another embodiment, a sensor device disposed to be overlaid on a display device including a display area for displaying an image and a non-display area outside the display area, the sensor device includes: a sensor driving electrode opposed to a position in an outermost periphery in the display area; detection electrodes each including a body portion opposed to the sensor driving electrode in the display area, and a broadened portion connected to the body portion and being wider than the body portion; and a lead line opposed to the non-display area and electrically connected to the broadened portion, the broadened portion being opposed to the non-display area without being opposed to the sensor driving electrode.

Embodiments will be described hereinafter with reference to the accompanying drawings. The disclosure is merely an example, and proper changes in keeping with the spirit of the invention, which are easily conceivable by a person of ordinary skill in the art, come within the scope of invention as a matter of course. To better clarify the explanations, the drawings may schematically show width, thickness, shape and the like, of each portion as compared with the actual aspect, but they are mere examples and do not restrict the interpretation of the invention. Furthermore, in the specification and drawings, constituent elements having the same or similar functions as those described in connection with preceding drawings are denoted by like reference numerals and duplicated detailed explanations may be arbitrarily omitted.

FIG. 1 is a perspective view schematically showing a configuration example of a sensor-equipped display device of one of embodiments. In the present embodiment, a liquid crystal display device is described as an example of a sensor-equipped display device. The display device can be used for, for example, various devices such as a smartphone, a tablet terminal, a mobile telephone terminal, a personal computer, a TV receiver, a vehicle-mounted device, and a game console. The major configuration explained in the present embodiment can also be applied to a self-luminous display device comprising an organic electroluminescent display element and the like, an electronic paper display device comprising a cataphoretic element and the like, a display device employing micro-electromechanical systems (MEMS), a display device employing electrochromism, and the like.

A liquid crystal display device DSP comprises an active-matrix display panel PNL, a driving IC chip IC1 which drives the display panel PNL, a capacitive sensor SE, a driving IC chip IC2 which drives the sensor SE, a backlight unit BL which illuminates the display panel PNL, a control module CM, flexible printed circuits FPC1, FPC2 and FPC3, and the like.

The display panel PNL includes a first substrate SUB1 in a plate-like shape, a second substrate SUB2 in a plate-like shape which is opposed to the first substrate SUB1, and a liquid crystal layer (a liquid crystal layer LQ explained later) held between the first substrate SUB1 and the second substrate SUB2. The display panel PNL includes a display area DA on which an image is displayed. In the example illustrated, the display panel PNL is a transmissive display panel having a transmissive display function of displaying an image by allowing light from the backlight unit BL to be transmitted selectively. The display panel PNL may be a reflective display panel having a reflective display function of displaying an image by allowing external light and auxiliary light incident from the second substrate SUB2 side to be reflected selectively. In addition, the display panel PNL may be a transflective display panel having the transmissive display function and the reflective display function.

The backlight unit BL is disposed on a back surface side of the first substrate SUB1. Various types of units are applicable as the backlight unit BL. A light-emitting diode (LED), a cold-cathode fluorescent tube (CCFL) or the like can be applied as the light source. Explanations of details of the structure of the backlight unit BL are omitted here. If the display panel PNL is in a reflective type, the backlight unit BL is excluded.

The sensor SE comprises detection electrodes Rx. The detection electrodes Rx are disposed on, for example, the display surface of the display panel PNL, i.e., the outer surface of the second substrate SUB2. The detection electrodes Rx are illustrated schematically. In the example illustrated, the detection electrodes Rx substantially extend in a first direction X so as to be arranged in a second direction Y. The detection electrodes Rx may extend in the second direction Y so as to be arranged in the first direction X or may be formed in an insular shape and arrayed in a matrix in the first direction X and the second direction Y. The first direction X and the second direction Y are orthogonal to each other. The first direction X and the second direction Y may intersect each other at an angle other than 90°. A third direction Z is orthogonal to each of the first direction X and the second direction Y.

The driving IC chip IC1 is mounted on the first substrate SUB1 of the display panel PNL. The flexible printed circuit FPC1 connects the display panel PNL with the control module CM. The flexible printed circuit FPC2 connects the detection electrodes Rx of the sensor SE with the control module CM. The driving IC chip IC2 is mounted on the flexible printed circuit FPC2. The driving IC chip IC2 may be mounted on the first substrate SUB1 or the control module CM. The flexible printed circuit FPC3 connects the backlight unit BL with the control module CM.

The driving IC chips IC1 and IC2 are connected to each other via the flexible printed circuit FPC2 or the like. For example, if the flexible printed circuit FPC2 includes a branch portion FPCB connected onto the first substrate SUB1, the driving IC chips IC1 and IC2 may be connected to each other via lines included in the branch portion FPCB and lines on the first substrate SUB1. Alternatively, the driving IC chips IC1 and IC2 may be connected to each other via lines included in each of the flexible printed circuits FPC1 and FPC2. Either of the driving IC chips IC1 and IC2 can generate a timing signal to notify a driving period of the sensor SE and supply the timing signal to the other driving IC chip. Either of the driving IC chips IC1 and IC2 can generate a timing signal to notify a driving period of a common electrode CE which will be explained later, and supply the timing signal to the other driving IC chip. Alternatively, the control module CM can supply the timing signal to the driving IC chips IC1 or IC2. The drive of the driving IC chip IC1 and the drive of the driving IC chip IC2 can be synchronized with each other by the timing signal.

Figure 2:
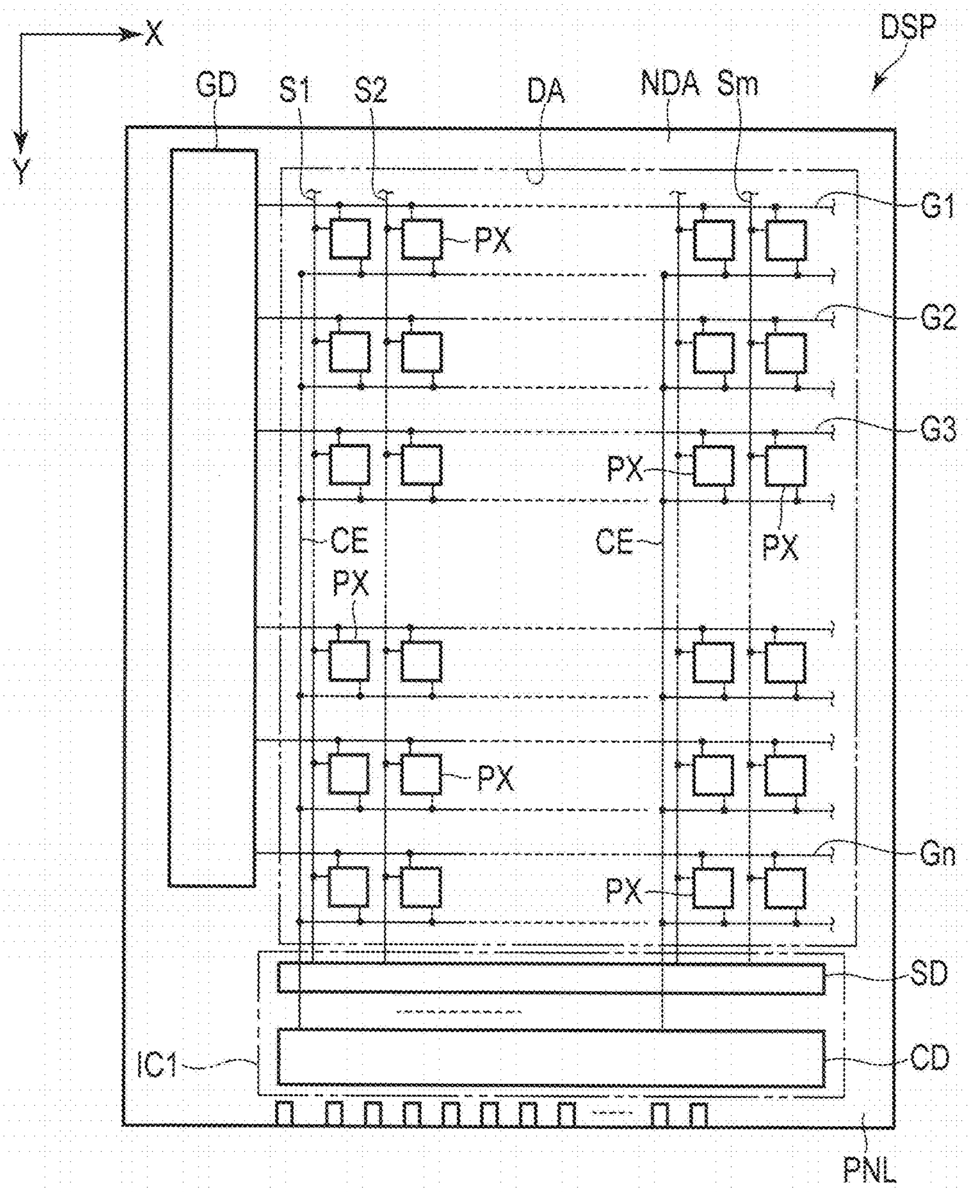
FIG. 2 is a view schematically showing a basic configuration and an equivalent circuit, of the liquid crystal display device DSP shown in FIG. 1.

FIG. 2 is a view schematically showing a basic configuration and an equivalent circuit, of the liquid crystal display device DSP shown in FIG. 1.

Besides the display panel PNL and the like, the liquid crystal display device DSP comprises a source line drive circuit SD, a gate line drive circuit GD, a common electrode drive circuit CD and the like, in a non-display area NDA outside the display area DA. For example, at least several parts of the source line drive circuit SD and the common electrode drive circuit CD are built in the driving IC chip IC1. The non-display area NDA is in a frame shape surrounding the display area DA.

The display panel PNL includes pixels PX in the display area DA. The pixels PX are disposed in a matrix in the first direction X and the second direction Y, and m×n pixels are arrayed (where m and n are positive integers). The pixels arranged in the first direction X form pixel rows while the pixels arranged in the second direction Y form pixel columns. The display panel PNL includes n gate lines G (G1 to Gn), m source lines S (S1 to Sm), a common electrode CE and the like in the display area DA.

The gate lines G extend in the first direction X to be drawn to the outside of the display area DA and connected to the gate line drive circuit GD. The gate lines G are arranged in the second direction Y to be spaced apart from each other. The source lines S extend in the second direction Y to be drawn to the outside of the display area DA and connected to the source line drive circuit SD. The source lines S are arranged in the first direction X to be spaced apart from each other, and intersect the gate lines G. The gate lines G and the source lines S may not extend straightforward, but may be bent in part. The common electrode CE is drawn to the outside of the display area DA to be connected to the common electrode drive circuit CD. The common electrode CE is shared by the pixels PX. Details of the common electrode CE will be explained later.

Figure 3:
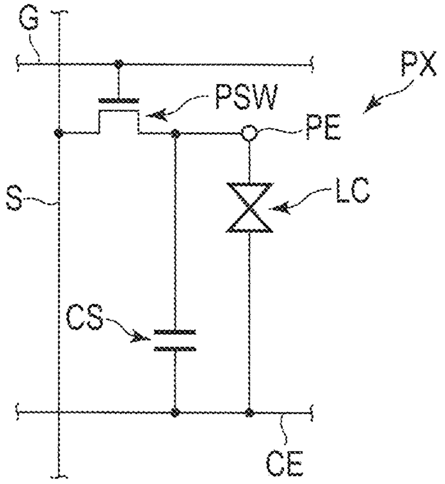
FIG. 3 is an equivalent circuit diagram showing one of pixels PX shown in FIG. 2.

FIG. 3 is an equivalent circuit diagram showing one of pixels PX shown in FIG. 2.

Each pixel PX comprises a switching element PSW, a pixel electrode PE, the common electrode CE, a liquid crystal layer LC and the like. The switching element PSW is composed of, for example, a thin-film transistor. The switching element PSW is electrically connected to the gate line G and the source line S. The switching element PSW may be a top-gate type switching element or a bottom-gate type switching element. A semiconductor layer of the switching element PSW is formed of, for example, polysilicon but may be formed of amorphous silicon, an oxide semiconductor or the like. The pixel electrode PE is electrically connected to the switching element PSW. The pixel electrode PE is opposed to the common electrode CE. A storage capacitor CS is formed, for example, between the common electrode CE and the pixel electrode PE.

Figure 4:
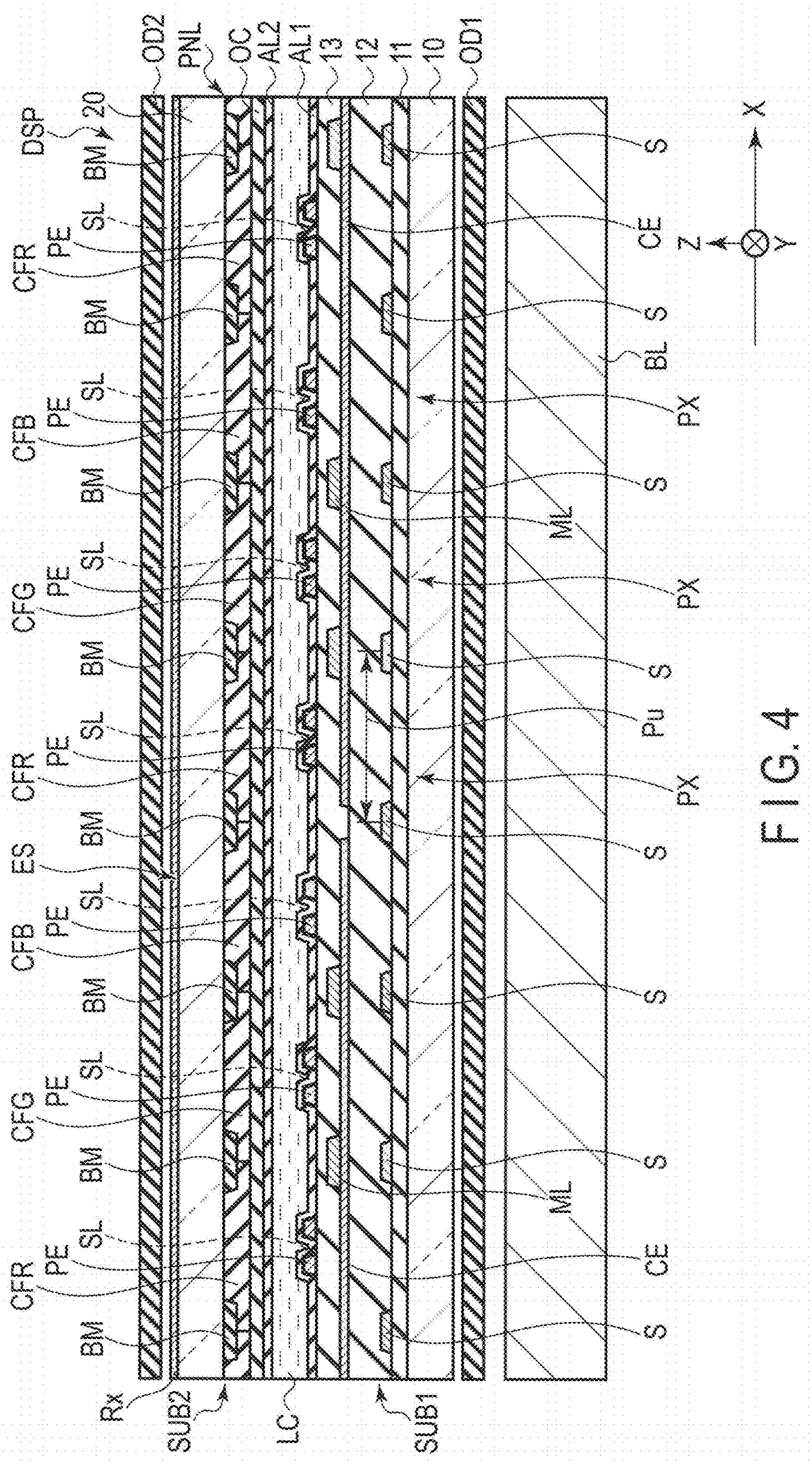
FIG. 4 is a cross-sectional view schematically showing in part a structure of the liquid crystal display device DSP.

FIG. 4 is a cross-sectional view schematically showing in part a structure of the liquid crystal display device DSP.

In the present embodiment, the display panel PNL may be configured to correspond to any one of a display mode using a longitudinal electric field along a normal line of a main surface of the substrate, a display mode using an oblique electric field angled with respect to the normal line of the main surface of the substrate, or a display mode using a lateral electric field along the main surface of the substrate. Furthermore, the display panel PNL may be configured to correspond to a display mode using an arbitrary combination of the longitudinal, lateral, and tilted electric fields. The main surface of the substrate indicates a surface parallel to an X-Y plane defined by the first direction X and the second direction Y which are orthogonal to each other. In the display mode using the longitudinal electric field or the oblique electric field, for example, the pixel electrodes PE are disposed on the first substrate SUB1 while the common electrode CE is disposed on the second substrate SUB2. In the display mode using the lateral electric field, the pixel electrodes PE and the common electrode CE are disposed on the first substrate SUB1.

In the example illustrated, the display panel PNL is configured to correspond to the display mode using the lateral electric field. On the display panel PNL, the first substrate SUB1 is opposed to the second substrate SUB2 with a predetermined gap formed between the substrates. The liquid crystal layer LC is located at the gap between the first substrate SUB1 and the second substrate SUB2.

The first substrate SUB1 includes a first insulating substrate 10 having a light transmitting property, such as a glass substrate or a resin substrate. The first substrate SUB1 includes the gate lines, the switching elements, the source lines S, the common electrode CE, the pixel electrodes PE, a first insulating film 11, a second insulating film 12, a third insulating film 13, a first alignment film AL1 and the like, on an upper side of the first insulating substrate 10, which is opposed to the second substrate SUB2.

The first insulating film 11 is disposed on the first insulating substrate 10. The switching elements of, for example, the top-gate structure are applied to the present embodiment though not described in detail. In such an embodiment, the first insulating film 11 includes insulating layers stacked in a third direction Z. For example, the first insulating film 11 includes various insulating layers such as an undercoat layer interposed between the first insulating substrate 10 and the semiconductor layers of the switching elements, a gate insulating layer interposed between the semiconductor layers and the gate electrodes, and an interlayer insulating layer interposed among electrodes including the gate electrodes, source electrodes and drain electrodes. Gate lines are disposed between the gate insulating layer and the interlayer insulating layer, similarly to the gate electrodes. The source lines S are located on the first insulating film 11. Source electrodes, drain electrodes and the like of the switching elements are also located on the first insulating film 11.

The second insulating film 12 is disposed on the source lines S and the first insulating film 11. The common electrode CE is shaped in a strip and located on the second insulating film 12. The common electrode CE is formed of a transparent conductive material such as indium tin oxide (ITO) or indium zinc oxide (IZO). In the example illustrated, a metal layer ML is located on the common electrode CE to reduce the resistance of the common electrode CE but may not be disposed.

The third insulating film 13 is disposed on the common electrode CE and the second insulating film 12. The pixel electrodes PE are located on the third insulating film 13. Each pixel electrode PE is located between adjacent signal lines S to be opposed to the common electrode CE. In addition, each pixel electrode PE includes a slit SL at a position opposed to the common electrode CE. The pixel electrodes PE are formed of, for example, a transparent conductive material such as ITO or IZO. The first alignment film AL1 covers the pixel electrodes PE and the third insulating film 13.

The common electrode CE is thus located in a layer different from the gate lines G and the source lines S, or the pixel electrodes PE. For this reason, the common electrode CE can be disposed in a positional relationship of intersecting the gate lines G and the source lines S, or the pixel electrodes PE without touching each other, in the X-Y plane. In other words, the common electrode CE can be disposed across a plurality of the adjacent pixels PX. In the present embodiment, the common electrode CE is shaped in a strip having a width which can be opposed to plural pixel columns and extends in the second direction Y.

The second substrate SUB2 includes a second insulating substrate 20 having a light transmitting property, such as a glass substrate or a resin substrate. The second substrate SUB2 includes a light-shielding layer BM, color filters CFR, CFG and CFB, an overcoat layer OC, a second alignment film AL2 and the like, on a lower side of the second insulating substrate 20, which is opposed to the first substrate SUB1.

The light-shielding layer BM is located on an inner surface of the second insulating substrate 20 and partitions the pixels. Each of the color filters CFR, CFG, and CFB is located on the inner surface of the second insulating substrate 20 and partially overlaid on the light-shielding layer BM. The color filter CFR is a red color filter arranged in a red pixel and is formed of a red resin material. The color filter CFG is a green color filter arranged in a green pixel and is formed of a green resin material. The color filter CFB is a blue color filter arranged in a blue pixel and is formed of a blue resin material. In the example illustrated, the unit pixel which is a minimum unit of the color image is composed of three color pixels, i.e., the red pixel, the green pixel, and the blue pixel. However, the unit pixel is not limited to a pixel formed by a combination of the three color pixels. For example, the unit pixel may be composed of four color pixels, i.e., the red pixel, the green pixel, the blue pixel and a white pixel. In this case, a white or transparent color filter may be arranged in the white pixel or the color filter of the white pixel may not be disposed. The overcoat layer OC covers the color filters CFR, CFG, and CFB. The overcoat layer OC is formed of a transparent resin material. The second alignment film AL2 covers the overcoat layer OC.

The detection electrodes Rx are located on the side of an outer surface ES of the second insulating substrate 20. In the example illustrated, the detection electrodes Rx are in contact with the outer surface ES of the second insulating substrate 20, but an insulating member may be interposed between the detection electrodes Rx and the outer surface ES. Details of the structure of the detection electrodes Rx will be explained later. The illustration is simplified, and lead lines L and the like which will be explained later are not illustrated. The detection electrodes Rx are formed of, for example, a metal material such as aluminum, which will be explained later. The time for detection can be reduced by lowering the electric resistance value of the detection electrodes Rx. For this reason, use of metal detection electrodes Rx is beneficial for achievement of a larger size and a higher fineness of the display panel PNL. Alternatively, the detection electrodes Rx may be formed of a combination (assembly) of a transparent conductive material (for example, a strip-shaped conductive layer) such as ITO or IZO, and a metal material (for example, a fine metal wire). Each detection electrode Rx is opposed to the common electrode CE via dielectric members such as the third insulating film 13, the first alignment film AL1, the liquid crystal layer LC, the second alignment film AL2, the overcoat layer OC, the color filters CFR, CFG and CFB, and the second insulating substrate 20.

The first optical element OD1 is disposed between the first insulating substrate 10 and the backlight unit BL. The second optical element OD2 is disposed above the detection electrode Rx. Each of the first optical element OD1 and the second optical element OD2 includes at least a polarizer and may include a retardation film as needed. The polarizer included in the first optical element OD1 and the polarizer included in the second optical element OD2 are disposed to have a crossed-Nicol relationship in which absorption axes of the polarizers intersect each other.

Next, the capacitive sensor SE built in the liquid crystal display device DSP of the present embodiment will be explained.

Figure 5:
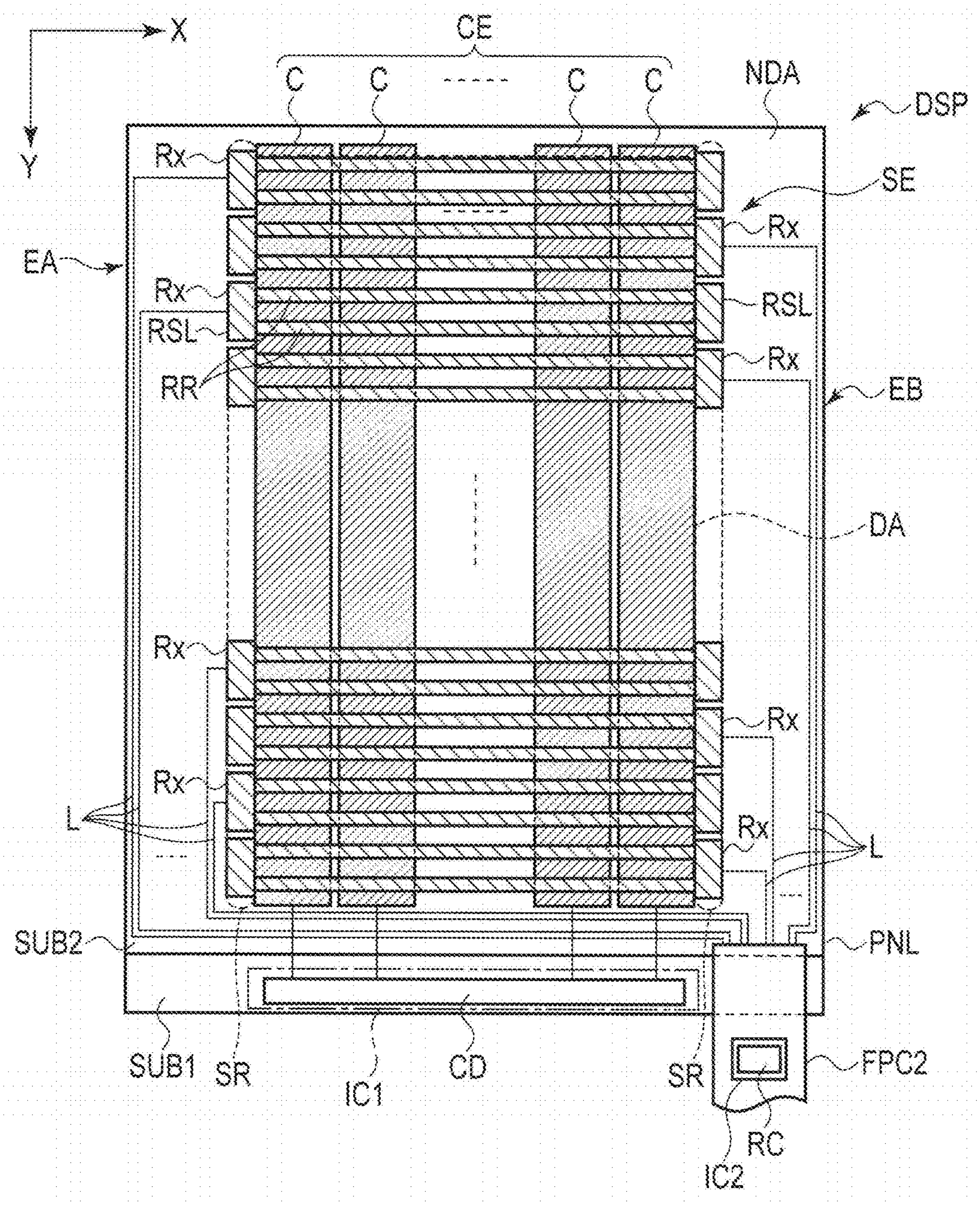
FIG. 5 is a plan view schematically showing a configuration of the sensor SE of the present embodiment.

FIG. 5 is a plan view schematically showing a configuration of the sensor SE of the present embodiment. In the present embodiment, the sensor SE comprises the common electrode CE of the first substrate SUB1 and the detection electrode Rx of the second substrate SUB2. In other words, the common electrode CE not only functions as an electrode for display by generating an electric field between the common electrode CE and the pixel electrodes PE but also functions as a sensor driving electrode by generating capacitance between the common electrode CE and the detection electrodes Rx.

The common electrode CE is disposed in the display area DA. In the example illustrated, the common electrode CE includes plural divisional electrodes C. The divisional electrodes C are arranged in the first direction X to be spaced apart from each other, in the display area DA. Each of the divisional electrodes C is in a strip shape and extends approximately straightforwardly in the second direction Y.

Each detection electrode Rx comprises a broadened portion RSL and a body portion RR. The broadened portions RSL are disposed in the non-display area NDA and arranged in the second direction Y. The body portions RR are disposed in the display area DA and arranged in the second direction Y. Each of the body portions RR extends approximately straightforwardly in the first direction X. In other words, the body portion RR extends in the direction of intersecting the plural divisional electrodes C. The body portion RR is formed in a strip shape as illustrated if seen macroscopically but, strictly, the body portion RR is composed of an assembly of fine metal wires as explained later. In addition, the broadened portion RSL is formed in a square shape as illustrated if seen macroscopically but, strictly, the broadened portion RSL is composed of an assembly of fine metal wires as explained later or a strip-shaped metal film and the like.

The broadened portions RSL arranged in the second direction Y form surrounding portions SR which will be described later in detail, in the non-display area NDA. In the example illustrated, the broadened portions RSL are arranged in the non-display area NDA extending along side edges EA and EB of the display panel PNL. The side edges EA and EB are parallel to the second direction Y. The pair of surrounding portions SR is located in the non-display area NDA extending along the side edges EA and EB so as to sandwich the display area DA. A gap between the adjacent broadened portions RSL is small and each of the broadened portions RSL is configured to suppress leakage of the electric field which will be explained later, though the illustration is simplified.

The common electrode CE and the detection electrodes Rx are opposed to sandwich various dielectrics as explained above. In the X-Y plane, each of the divisional electrodes Cis opposed to the pixel columns and the source lines S shown in FIG. 2 and intersects the gate lines G. Each of the detection electrodes Rx is opposed to the pixel rows and the gate lines G shown in FIG. 2 and intersects the source lines S. The number, size and shape of the divisional electrodes C are not particularly limited and can be variously changed. The divisional electrodes C of the common electrode CE may be arranged in the second direction Y to be spaced apart from each other and extend approximately straightforwardly in the first direction X as explained later. Furthermore, the common electrode CE may not be divided but be a plate electrode extending continuously in the display area DA.

The display panel PNL includes lead lines L besides the common electrode CE and the detection electrodes Rx. The lead lines L are disposed in the non-display area NDA and located in the same plane as the detection electrodes Rx, on the second substrate SUB2. The lead lines L are electrically connected to the detection electrodes Rx in a one-to-one correspondence. Each of the lead lines L allows a sensor output value to be output from the detection electrode Rx.

In the example illustrated, the lead lines L are disposed on both sides of the display area DA so as to sandwich the display area DA. For example, the lead lines L connected to odd-numbered detection electrodes Rx, of the detection electrodes Rx arranged in the second direction Y, are disposed in the non-display area NDA on the left side of the drawing (i.e., the non-display area NDA extending along the side edge EA), and the lead lines L connected to even-numbered detection electrodes Rx are disposed in the non-display area NDA on the right side of the drawing (i.e., the non-display area NDA extending along the side edge EB). The layout of the lead lines L corresponds to the uniform width and the narrow frame of the non-display area NDA. It should be noted that the layout of the lead lines L is not limited to the example illustrated. For example, the embodiment can also employ the layout in which the lead lines L connected to the detection electrodes Rx at upper part of the display area DA are located on either of the end portions of the non-display area NDA while the lead lines L connected to the detection electrodes Rx at lower part of the display area DA are located on the other end portion of the non-display area NDA. The surrounding portions SR are located between the lead lines L and the common electrode CE on the left side of the drawing and between the lead lines L and the common electrode CE on the right side of the drawing, in planar view.

Each of the divisional electrodes C is electrically connected to the common electrode drive circuit CD. For example, at least several parts of the common electrode drive circuit CD are built in the driving IC chip IC1, but are not limited to this example. The common electrode drive circuit CD may be disposed, for example, outside the driving IC chip IC1. The common electrode drive circuit CD functions as a driving module configured to supply a common drive signal to the common electrode CE at the display drive or displaying an image and to supply a sensor drive signal to the common electrodes CE at the sensing drive for sensing.

The flexible printed circuit FPC2 is connected to the second substrate SUB2 and also electrically connected to each of the lead lines L, in the non-display area NDA on the lower side (i.e., the side close to the driving IC chip IC1) of the drawing. A detection circuit RC is built in, for example, the driving IC chip IC2. The detection circuit RC functions as a driving module configured to allow the sensor drive signal from the common electrode CE to be detected as detection signals by the detection electrodes Rx and to read variation of the detection signals via the lead lines L as a sensor output signal. The detection circuit RC having such a function detects contact or approach of a detected object to the liquid crystal display device DSP, based on the sensor output values from the detection electrodes Rx. Furthermore, the detection circuit RC can also detect position information of the portion which the detected object has contacted or approached. The detection circuit RC may be disposed in the control module CM.

If the layout of the lead lines L illustrated is noticed, the detection electrodes Rx located on the lower side of the drawing are connected to the lead lines L located on the inner side (i.e., the side close to the display area DA) in the non-display area NDA. In addition, the detection electrodes Rx located on the upper side of the drawing are connected to the lead lines L located on the outer side (i.e., the side remote from the display area DA) in the non-display area NDA. The lead lines L located on the outer side are longer than the lead lines L located on the inner side, in the non-display area NDA. For this reason, the electric resistance of the lead lines L having a greater length needs to be reduced. For example, the lead lines L having a greater length include wider portions as compared with the lead lines L having a smaller length. In the non-display area NDA on the lower side of the drawing, each lead line L has a comparatively small width due to a large number of lead lines L, though not explained in detail. In the non-display area NDA on the upper side of the drawing, each lead line L has a comparatively great width since the number of lead lines L is small. For example, the lead lines L located on the outermost side in the non-display area NDA have a gradually increased width, from the lower side to the upper side in the drawing.

Figure 6:
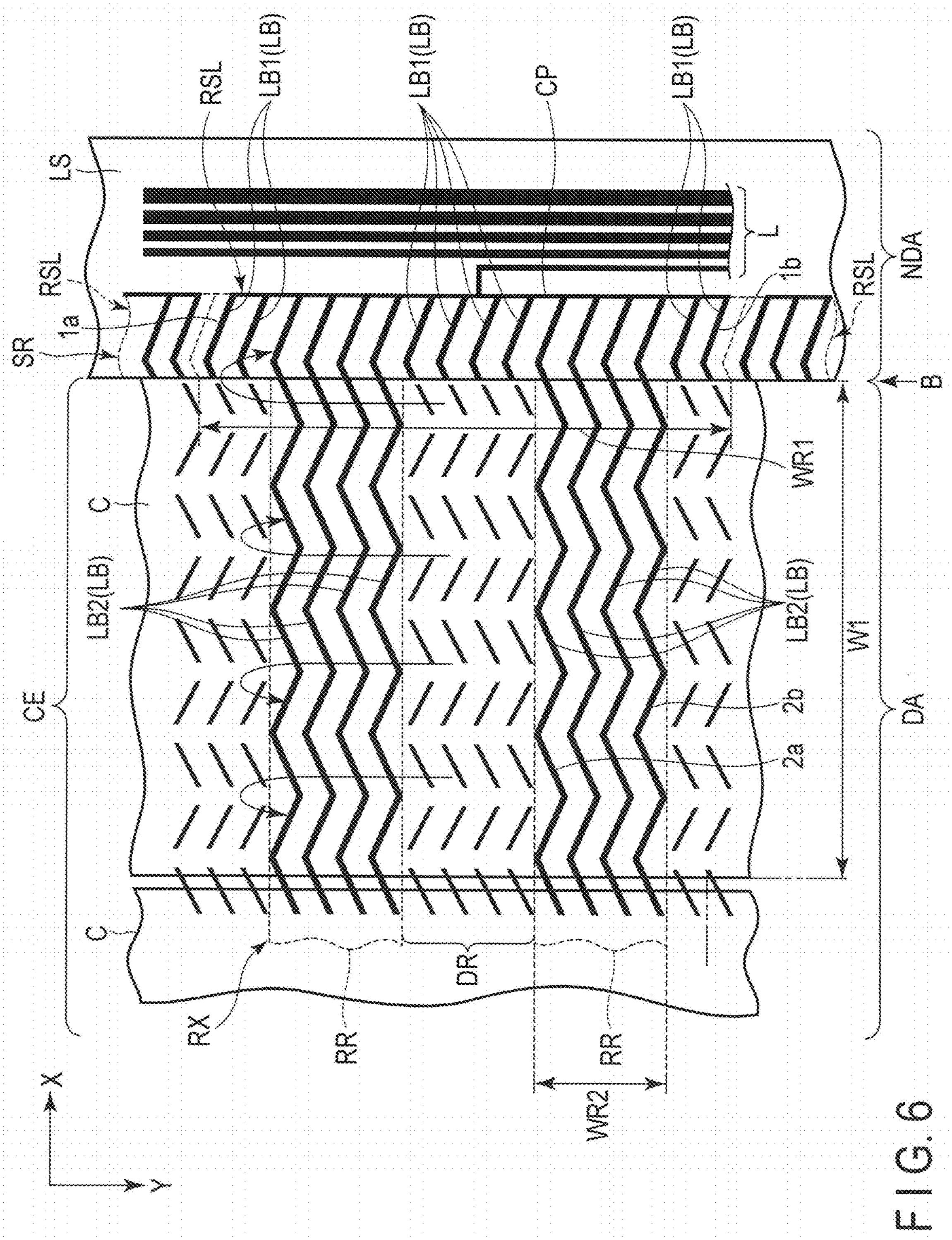
FIG. 6 is a plan view enlarging and schematically showing a part of the sensor SE shown in FIG. 5.

FIG. 6 is a plan view enlarging and schematically showing a part of the sensor SE shown in FIG. 5. A peripheral light-shielding layer LS extends across a substantially entire area of the non-display area NDA. The divisional electrodes C of the common electrode CE correspond to sensor driving electrodes and are arranged in the first direction X, in the display area DA. Each of the divisional electrodes C has a first electrode width W1 in the first direction X. Desirably, however, the first electrode width W1 is an integer multiple of a pixel pitch Pu in the first direction X of the pixel PX. The pixel pitch Pu is a pitch in the first direction X in the center of adjacent source lines S shown in FIG. 4.

A boundary B between the display area DA and the non-display area NDA corresponds to a position of an edge of the peripheral light-shielding layer LS on the display area side. A side edge of the divisional electrode C closest to the non-display area NDA, of the common electrode CE, is disposed at a position overlaid on the boundary B, in the example illustrated. However, displacement in bonding of the first substrate SUB1 and the second substrate SUB2 often occurs in the structure in which the common electrode CE is disposed on the first substrate SUB1 while the peripheral light-shielding layer LS is disposed on the second substrate SUB2 similarly to the light-shielding layer BM as explained above. For this reason, the side edge of the divisional electrode C is not necessarily overlaid on the boundary B, and may be displaced to the display area side or the non-display area side rather than the boundary B, by a distance corresponding to the displacement in bonding of the substrates.

The lead lines L are disposed in the non-display area NDA. In other words, the lead lines L are disposed at positions overlaid on the peripheral light-shielding layer LS. The lead lines L substantially extend in the second direction Y and are arranged in the first direction X at approximately regular intervals, in the non-display area NDA. In the example illustrated, the lead lines L have a greater width as the lead lines L are positioned farther away from the display area DA, as explained above.

Each detection electrode Rx comprises a broadened portion RSL and a body portion RR connected to each other.

The broadened portion RSL is electrically connected to the lead lines L. In addition, the broadened portion RSL is not overlaid on the display area DA and is disposed in the non-display area NDA, in planar view. The broadened portion RSL is disposed at a position overlaid on the peripheral light-shielding layer LS and is not overlaid on the divisional electrode C located at the outermost side edge in the display area DA. In the example illustrated, the side edge of the broadened portion RSL on the display area side is located in the boundary B. In other words, the broadened portion RSL is located between the boundary B (or the side edge of the divisional electrode C closest to the non-display area NDA) and the lead lines L, in the X-Y plane shown in FIG. 6. The broadened portion RSL is located in a longitudinally elongated area extending in the second direction Y, and has a first width WR1 in the second direction Y.

The body portion RR is formed in a strip shape so as to have an end portion linked to the broadened portion RSL, and is disposed in the display area DA. The body portion RR is opposed to the common electrode CE, in the display area DA. The body portion RR is located in a laterally elongated area extending in the first direction X. In addition, the body portion RR has a second width WR2 in the second direction Y. The second width WR2 is less than the first width WR1. In other words, the broadened portion RSL is wider than the body portion RR.

In the example illustrated, the broadened portion RSL is connected to two body portions RR arranged in the second direction Y. In addition, the broadened portion RSL is arranged with the main portion RR in the first direction X and located across an area protruding to both sides of the body portion RR in the second direction Y.

As the detection electrode Rx illustrated are noticed, one side of the detection electrode Rx is substantially shaped in a II letter (see FIG. 6). The detection electrodes Rx on the opposite side of the display area DA (not shown) are formed in a similar shape, and one of the detection electrodes Rx is substantially shaped in an II letter (see FIG. 5).

In the present embodiment, each of the detection electrodes Rx is composed of a connection portion CP and detection lines LB. The connection portion CP and the detection lines LB are metallic. The connection portion CP is connected to the broadened portion RSL and the lead lines L. The detection lines LB are disposed to extend from the non-display area NDA to the edge of the display area DA. The detection lines LB are connected from an end side to the other end side of the connection portion CP in the non-display area NDA, and substantially extends in the first direction X. In the example illustrated, each of the detection lines LB is shaped in a waveform (more specifically, a triangular waveform) in the first direction X. Each linear segment forming the waveform extends in a direction different from the first direction X and the second direction Y. The detection lines LB are arranged at substantially regular intervals in the second direction Y along the boundary B. The detection lines LB of the detection electrodes Rx adjacent in the second direction Y are also arranged at substantially regular intervals in the second direction Y along the boundary B. The detection lines LB includes first detection lines LB1 disposed on the broadened portion RSL alone, and second detection lines LB2 which are much longer than the first detection lines LB1 so as to be formed across the both of broadened portions RSL and the body portion RR. As shown in FIG. 6, two first detection lines LB1, four second detection lines LB2, four first detection lines LB1, four second detection lines LB2, and two first detection lines LB1, which are arranged in order from the upper side to the lower side in the drawing, are connected to the connection portion CP.

In other words, the broadened portion RSL is composed of an assembly of proximal end portions of the second detection lines LB2, and the first detection lines LB1 disposed on both sides of the proximal end portions with the same length as the proximal end portions. The body portion RR is composed of an assembly of the second detection lines LB2 be formed from the one broadened portion RSL to the other broadened portion RSL. In other words, the number of detection lines LB (i.e., the total number of first detection lines LB1 and second detection lines LB2, for example, sixteen) on the broadened portion RSL is more than the number of detection lines LB (i.e., the total number of second detection lines LB2, for example, four) on each body portion RR.

The first width WR1 of the broadened portion RSL and the second width WR2 of the body portion RR correspond to distances in the second direction Y between the detection lines LB which are connected to the end side and the other end side of the connection portion CP, respectively. In the example illustrated, the first width WR1 is a first distance in the second direction Y of the first detection line 1*a* (i.e., a top portion protruding to the upper side of the drawing, of the first detection line 1*a*) connected to one of the end sides of the connection portion CP, and the first detection line 1*b* (i.e., a top portion protruding to the lower side of the drawing, of the first detection line 1*b*) connected to the other end side of the connection portion CP. The second width WR2 is a second distance in the second direction Y of the second detection line 2*a* (i.e., a top portion protruding to the upper side of the drawing, of the second detection line 2*a*) connected to one of the end sides of the connection portion CP, and the second detection line 2*b* (i.e., a top portion protruding to the lower side of the drawing, of the second detection line 2*b*) connected to the other end side of the connection portion CP.

A dummy electrode DR is disposed between the adjacent body portions RR, in the display area DA. The dummy electrodes DR is disposed parallel to the detection lines LB, at approximately regular intervals from the detection lines LB. The dummy electrode DR is not connected to the lines such as the lead lines L or detection lines LB, and is in the electrically floating state. In the example illustrated, the dummy electrode DR is disposed between the adjacent body portions RR but is not disposed between the adjacent broadened portions RSL.

The detection electrodes Rx are arranged in the second direction Y. The broadened portions RSL of the detection electrodes Rx arranged in the second direction Y are electrically insulated from each other and disposed to be adjacent to each other. In other words, in each detection electrode Rx, the detection lines LB of the broadened portion RSL are arranged in the second direction Y at substantially regular intervals. In the broadened portions RSL of the adjacent detection electrodes Rx, also, the detection lines LB are arranged in the second direction Y at substantially regular intervals, without the dummy electrode DR interposed between the one broadened portion and the other broadened portion adjacent to.

The detection lines LB of the broadened portion RSL are formed nonlinearly. The detection lines LB of the adjacent broadened portions RSL are formed in the same shape. In the example illustrated, each of the adjacent detection lines LB is formed in a waveform shape. For this reason, a linear gap crossing the broadened portion is not formed between the adjacent broadened portions RSL. In other words, the broadened portions RSL of the adjacent detection electrodes Rx are disposed such that either of the broadened portions RSL is engaged with the other broadened portion RSL in planar view. In the example illustrated, an area between the adjacent broadened portions RSL is bended by the detection lines LB of the same waveform shape, and leakage of the electric field from the area between the broadened portions can be suppressed.

The broadened portions RSL are arranged on the same straight line in the second direction Y so as to form the surrounding portion SR. In other words, in the adjacent detection electrodes Rx, the gap opposed to the common electrode CE is formed between the body portions RR while, in the non-display area NDA, the gap between the body portions RR is surrounded by the broadened portions RSL arranged in the same straight line, along the boundary B. The broadened portions RSL forming the surrounding portion SR are physically separated from each other, but disposed to be engaged with each other as explained above. For this reason, the surrounding portion SR can implement an electric field shielding along the boundary B in the non-display area NDA extending without a gap. More specifically, the end portion of one of the adjacent broadened portions RSL includes bent portions by forming the first detection lines LB1 in a waveform shape. Since the broadened portions RSL are disposed to have the end portions engaged with each other and the surrounding portion SR is formed, a gap between the broadened portions adjacent to is also bended, not extending in a straight line from the display area DA to the non-display area NDA. Thus, an electric line of force does not reach the non-display area NDA from the display area DA, but is captured by (the end portion of) any one of the broadened portions RSL, and an electric field is formed between the broadened portion RSL and the common electrode CE.

The surrounding portion SR is interposed between the common electrode CE of the display area DA and the lead lines L of the non-display area NDA, in planar view. The surrounding portion SR thereby functions as what is called a barrier between the common electrode CE and the lead lines L, which suppresses formation of the electric field between the common electrode CE and the lead lines L and suppresses formation of the capacitance between the common electrode CE and the lead lines L. In other words, electrostatic capacitance is formed between the common electrode CE and the broadened portion RSL, through the gap between the body portions RR and, consequently, formation of electrostatic capacitance between the common electrode CE and the lead lines L through the gap can be suppressed. Since formation of the capacitance between the common electrode CE in the gap of the detection electrode Rx and lead lines L connected to a detection electrode different from the detection electrode Rx can be particularly suppressed, error detection of the sensor SE can be suppressed.

In addition, electrostatic capacitance is formed between the common electrode CE and the broadened portions RSL in the non-display area NDA extending along the boundary B, and the object can be certainly detected in this area, too.

The shape of the broadened portions RSL of the detection electrode Rx is not limited to the linear waveform, but can also be a circular waveform of a sine wave or the like. In other words, any shape can be applied if the recess portions and protruding portions on the end portions of the adjacent broadened portions RSL are engaged with each other and a boundary between the end portions is not formed in a straight line.

Figure 7:
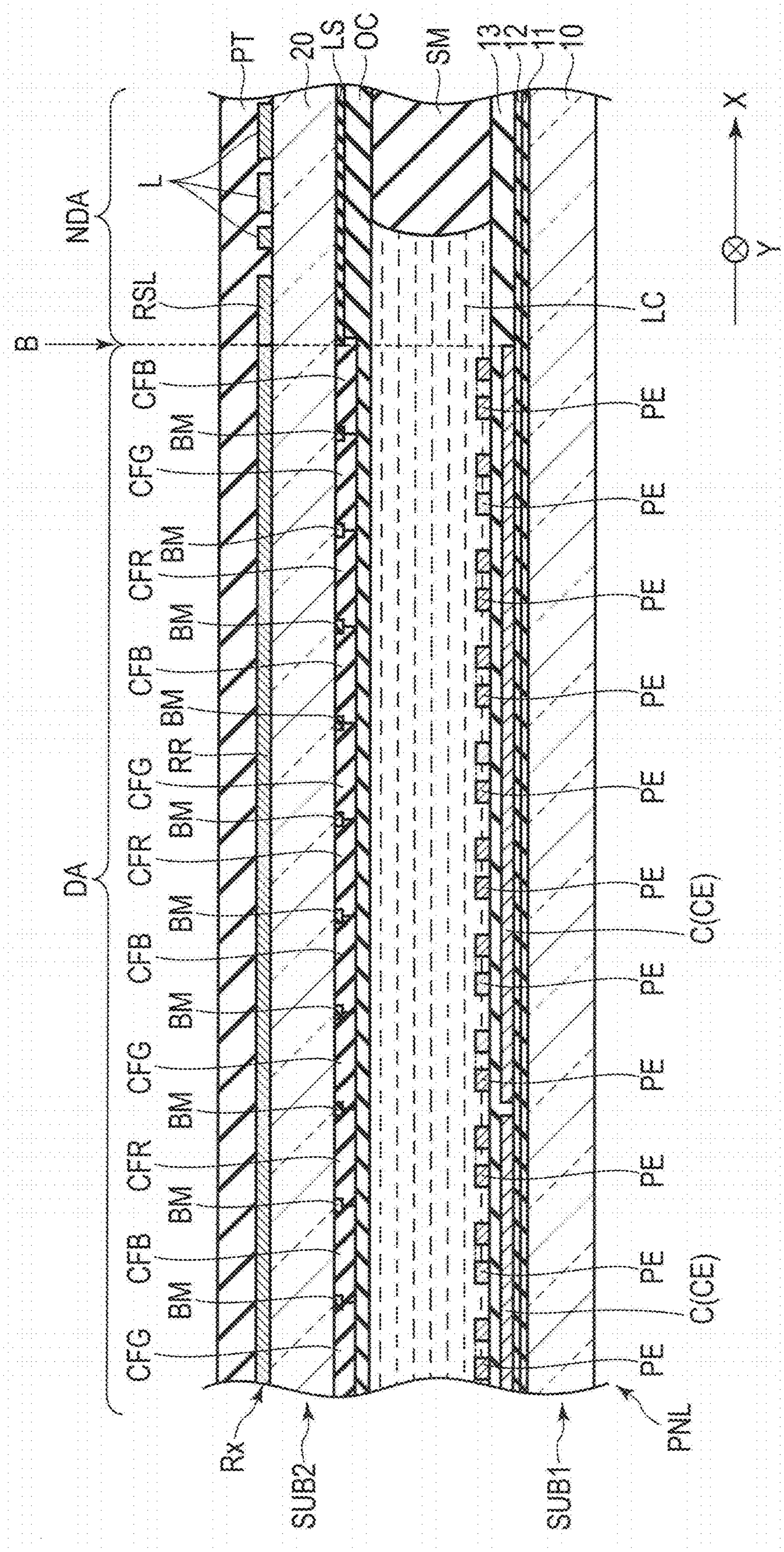
FIG. 7 is a cross-sectional view schematically showing a structure of a display panel PNL including a part of the sensor SE shown in FIG. 6.

FIG. 7 is a cross-sectional view schematically showing a structure of a display panel PNL including a part of the sensor SE shown in FIG. 6. Main portions alone necessary for explanations are illustrated.

A sealing member SM is disposed between the first substrate SUB1 and the second substrate SUB2 to surround an area which is to be the non-display area NDA in planar view, and the liquid crystal layer LC is thereby sealed between the first substrate SUB1 and the second substrate SUB2. The common electrode CE and the pixel electrodes PE are located on an inner surface side of the first substrate SUB1 which is opposed to the second substrate SUB2. In other words, the common electrode CE is located on the second insulating film 12 and covered with the third insulating film 13. The pixel electrodes PE are located on the third insulating film 13 and are opposed to the common electrode CE. The number of the pixel electrodes PE located just above the common electrode C is not limited to this. Various lines such as the source lines and the first alignment film are not illustrated.

The light-shielding layer BM, the color filters CFR, CFG and CFB, the overcoat layer OC, and a peripheral light-shielding layer LS are located on an inner surface side of the second substrate SUB2 which is opposed to the first substrate SUB1. In other words, the color filters CFR, CFG and CFB are opposed to the pixel electrodes PE, in the display area DA. The light-shielding layer BM is located at each of boundaries of the color filters CFR, CFG and CFB. The peripheral light-shielding layer LS is located on the inner surface of the second insulating substrate 20, in the non-display area NDA. The peripheral light-shielding layer LS can be formed of the same material as the light-shielding layer BM. The overcoat layer OC extends across the display area DA and the non-display area NDA. It should be noted that the second alignment film is not illustrated.

The detection electrode Rx and the lead lines L are located on the outer surface side of the second substrate SUB2 which is opposite to the side opposed to the first substrate SUB1. The detection electrode Rx and the lead lines L can be formed of the same material, for example, a metallic material such as aluminum (Al), titanium (Ti), silver (Ag), molybdenum (Mo), tungsten (W), copper (Cu) or chromium (Cr) or an alloy formed of a combination of the metallic materials. Each of the detection electrode Rx and the lead lines L may be a single-layer body of the metallic material or a laminate formed by stacking layers of the metallic materials. Furthermore, each of the detection electrode Rx and the lead lines L may be composed of a combination of a single-layer body or a laminate of the metallic material with a transparent conductive layer of ITO or the like. The body portion RR of the detection electrodes Rx is located above the common electrode CE and the pixel electrodes PE. In the example illustrated, none of the common electrode CE and the pixel electrode PE is disposed under the broadened portion RSL. In other words, the body portion RR is opposed to the common electrode CE while the broadened portion RSL is connected to the body portion RR without being opposed to the common electrode CE. The sealing member SM is disposed under the lead lines L. The detection electrode Rx located in the display area DA is formed of the nontransparent metallic material but does not remarkably reduce the transmittance of each pixel since the detection electrode Rx is formed of, for example, the detection lines LB formed of fine wires having a width of approximately 3 to 5 μm. In addition, since each of the detection lines LB is formed of a fine wire extending in a direction different from the directions of alignment of the pixels (i.e., the first direction X and the second direction Y) as shown in FIG. 6, moire of the pixel layout is suppressed and the deterioration in display quality can be suppressed.

A protective film PT is further disposed on the outer surface side of the second substrate SUB2. The protective film PT covers the detection electrode Rx and the lead lines L. The protective film PT is formed of, for example, a transparent resin material or a transparent organic material.

Next, operations of display drive of displaying an image at the liquid crystal display device DSP having the above-explained configuration will be explained.

First, an off state in which no fringing field is formed at the liquid crystal layer LC will be explained. The off state corresponds to a state in which a potential difference is not formed between the pixel electrodes PE and the common electrodes CE. In the off state, liquid crystal molecules contained in the liquid crystal layer LC are subjected to initial alignment in the single orientation in the X-Y plane by the alignment restriction force between the first alignment film AL1 and the second alignment film AL2. Part of the backlight from the backlight unit BL is transmitted through the polarizer of the first optical element OD1 and is made incident on the display panel PNL. The light incident on the display panel PNL is linearly polarized light which is orthogonal to an absorption axis of the polarizer. The polarized state of the linearly polarized light hardly changes when the linearly polarized light passes though the display panel PNL in the off state. For this reason, most of the linearly polarized light which has passed through the display panel PNL is absorbed by the polarizer of the second optical element OD2 (black display). In other words, the light from the backlight unit BL does not contribute to the display, and a black screen is displayed in the display area DA. A mode of displaying the black screen on the display panel PNL in the off state is called a normally black mode.

Next, the on state in which the fringe field is formed in the liquid crystal layer LC will be explained. The on state corresponds to a state in which a potential difference is formed between the pixel electrodes PE and the common electrodes CE. In the on state, the common drive signal is supplied from the common electrode drive circuit CD to the common electrodes CE. In contrast, a video signal to form the potential difference relative to the common potential is supplied to the pixel electrodes PE. The fringing field is thereby formed between the pixel electrodes PE and the common electrodes CE.

In the on state, the liquid crystal molecules are aligned in the orientation different from the initial alignment orientation within the X-Y plane due to influence of the fringing field formed in the liquid crystal layer. The linearly polarized light orthogonal to the absorption axis of the polarizer of the first optical element OD1 is incident on the display panel PNL and the polarized state is varied in response to the alignment of the liquid crystal molecules when passing through the liquid crystal layer LC. For this reason, at least part of the light which has passed through the liquid crystal layer LC transmits the polarizer of the second optical element OD2, in the on state (white display). In the above-explained display modes, vicinity to the edges of the pixel electrodes PE mainly contributes to the display since the fringing field is formed along the edges of the pixel electrodes PE.

Next, a sensing drive operation of detecting the contact or approach of an object in the liquid crystal display device DSP will be explained.

Figure 8:
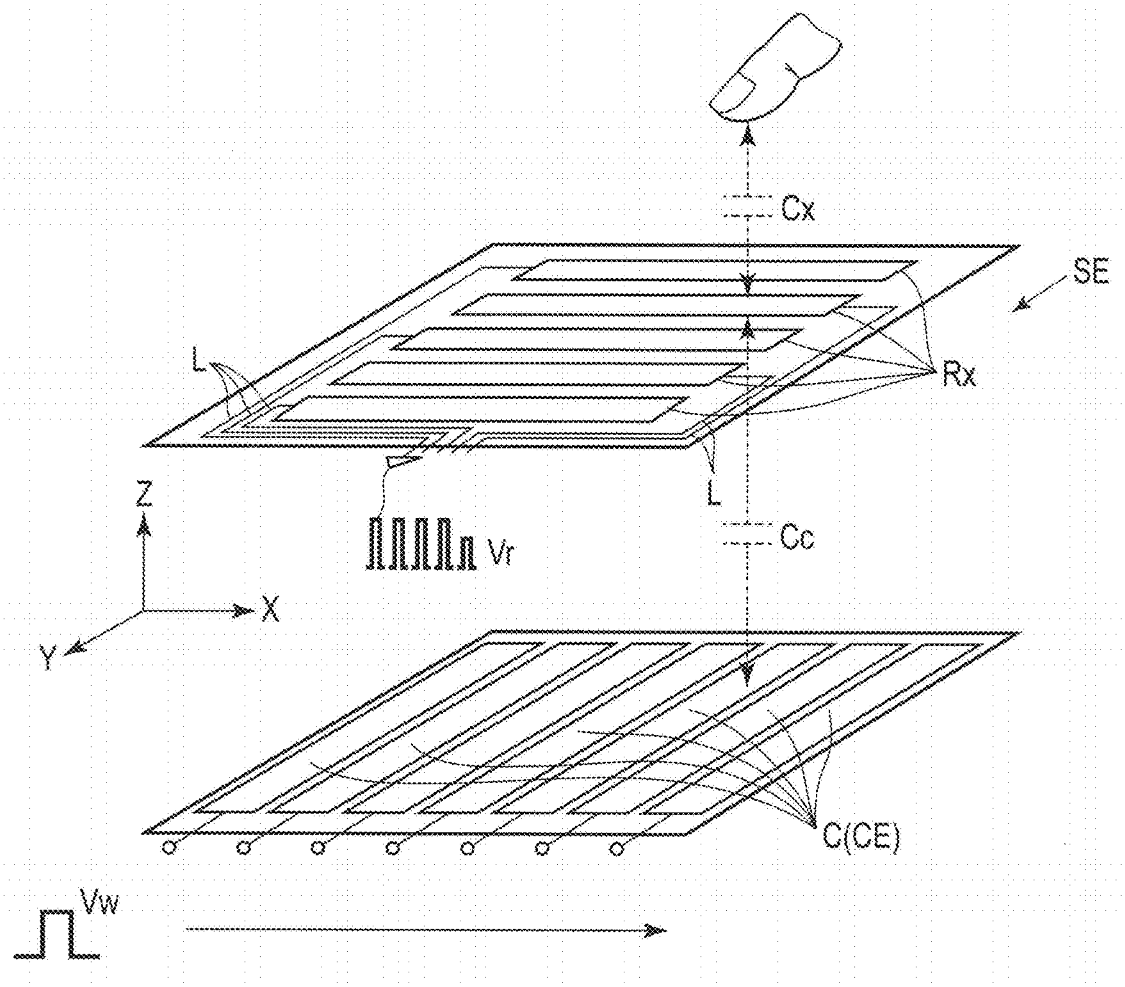
FIG. 8 is an illustration for explaining a principle of an example of a sensing method.

A sensor drive signal is supplied from the common electrode drive circuit CD to the common electrodes CE. The sensing is performed in this state. A principle in an example of a sensing method will be explained with reference to FIG. 8.

Capacitance Cc exists between the divisional electrodes C and the detection electrodes Rx. A pulse-like write signal (sensor drive signal) Vw is supplied to the divisional electrodes C, sequentially, in a predetermined cycle. In this example, the user's finger which is the detected object is assumed to be present closely to a position where a specific detection electrode Rx and a specific divisional electrode C intersect. A capacitance Cx is generated by the detected object close to the detection electrode Rx. When the pulse-like write signal Vw is supplied to the divisional electrodes C, a pulse-like read signal (sensor output value) Vr lower in level than pulses obtained from the other detection electrodes is obtained from the specific detection electrode Rx.

The detection circuit RC shown in FIG. 5 can detect two-dimensional position information in the X-Y plane of the sensor SE, based on the timing of supplying the write signal Vw to the divisional electrodes C and on the read signals Vr from the respective detection electrodes Rx. In addition, the capacitance Cx obtained when the detected object is close to the detection electrode Rx is different from that obtained when the detected object is remote from the detection electrode Rx. For this reason, the level of the read signal Vr obtained when the detected object is close to the detection Rx is different from that obtained when the detected object is remote from the detection electrode Rx. Therefore, the detection circuit RC can also detect the proximity of the detected object to the sensor SE (i.e., a distance in a third direction Z from the sensor SE), based on the level of the read signal Vr.

According to the present embodiment, each of the detection electrodes Rx of the sensor SE comprises the body portion RR opposed to the common electrode CE and the broadened portion RSL wider than the body portion RR. The gap opposed to the common electrode CE is formed between the adjacent body portions RR, at the detection electrodes Rx disposed to be adjacent, while, in the non-display area NDA, the broadened portions RSL are arranged to be adjacent along the boundary B. For this reason, electrostatic capacitance is formed between the common electrode CE and the broadened portions RSL, through the gaps between the body portions RR and, consequently, formation of electrostatic capacitance between the common electrode CE and the lead lines L through the gaps can be suppressed. In addition, undesired formation of the capacitance between the common electrode CE and the lead lines L can be suppressed even in the configuration in which the common electrode CE and the lead lines L are arranged to be close in response to the request for narrower frame. Therefore, in the sensing driving, the capacitive coupling between the common electrode CE and the lead lines L (particularly, lead lines L connected to detection electrodes Rx different from the detection electrodes Rx which are to be read) can be suppressed and the error detection of the sensor SE can be suppressed.

In addition, the broadened portions RSL are not overlaid on the display area DA but disposed in the non-display area NDA, in planar view, in the present embodiment. In other words, the broadened portions RSL are not overlaid or hardly overlaid on the common electrode CE located in the display area DA, in planar view. For this reason, substantially constant capacitance Cc can be obtained between the common electrode CE and the detection electrodes Rx, over the entire display area DA.

In addition, since the detection electrodes Rx and the lead lines L are located on the outer surface side of the second insulating substrate 20, the detection electrodes Rx and the lead lines L can be formed of the same material, in the same process. Furthermore, since the detection electrodes Rx and the lead lines L are formed of a metal having a very lower electric resistance than the transparent conductive material, the line width can be reduced and the wire can be drawn in a long distance while maintaining the small line width.

Moreover, since the width of the detection lines LB is small, the transmittance of each pixel in the display area DA is not remarkably deteriorated. Since each of the detection lines LB extends in a direction different from the directions of alignment of the pixels (i.e., the first direction X and the second direction Y), moire of the pixel layout is suppressed and the deterioration in display quality is also suppressed. In addition, since the width of the lead lines L is small, undesired formation of the capacitance between the lead lines L and the detected object which has contacted or approached the non-display area NDA can be suppressed, and noise can be reduced.

Next, a modified example of the capacitive sensor SE built in the liquid crystal display device DSP of the present embodiment will be explained. A modified example of the shape of the broadened portion RSL will be particularly explained. As explained above, the broadened portion RSL is located in the non-display area NDA overlaid on the peripheral light-shielding layer LS and is not located in the display area DA. For this reason, since the shape of the broadened portion RSL does not influence the display in the display area DA, the shape has high degree of freedom.

Figure 9:
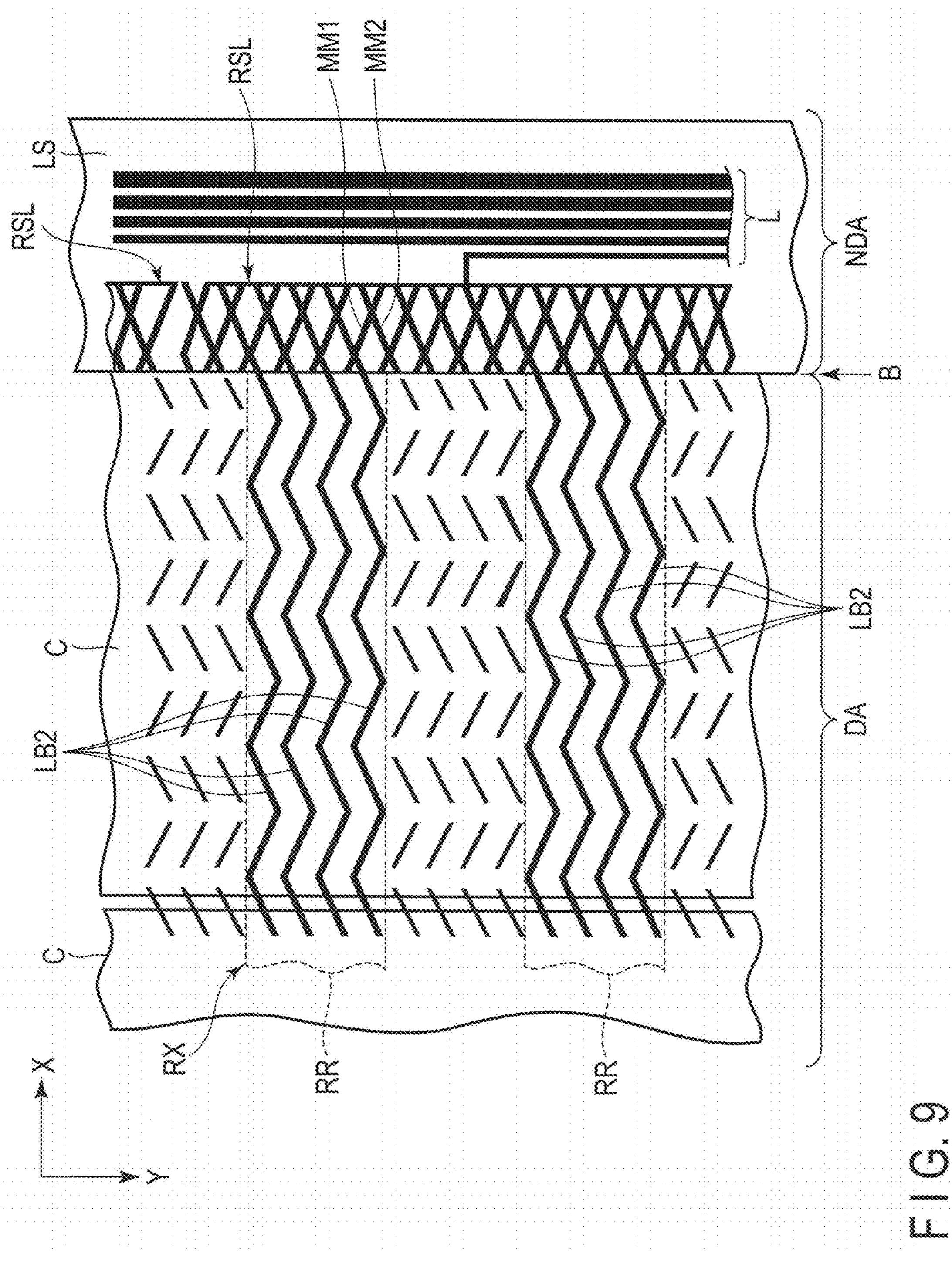
FIG. 9 is another plan view enlarging and schematically showing a part of the sensor SE shown in FIG. 5.

FIG. 9 is another plan view enlarging and schematically showing a part of the sensor SE shown in FIG. 5. The example shown in FIG. 9 is different from the example shown in FIG. 6 with respect to a feature that the broadened portion RSL of the detection electrode Rx includes metal fine wires shaped in mesh. In a modified example hereinafter explained, the same constituent elements as those in the example shown in FIG. 6 are denoted by like reference numerals and their detailed description is omitted. The body portions RR may be formed of second detection lines LB2 shaped in waveform, similarly to the example shown in FIG. 6, or may be in the other shape such as mesh.

The metal fine wires forming the broadened portion RSL include segments MM1 and MM2 extending in different directions. The segments MM1 and MM2 intersect each other to form the mesh shape. Each of the segments MM1 and MM2 extends in, for example, a direction different from the first direction X and the second direction Y. The shape of the metal fine wires is not limited to the example illustrated if it is the mesh shape.

The broadened portion RSL thus configured includes the segments of higher density as compared with the detection lines LB of the broadened portion RSL shown in FIG. 6. For this reason, the electric field shielding effect of the broadened portion RSL can be improved and the formation of capacitance between the common electrode CE and the lead lines L through the gap between the body portions RR can be further suppressed, as compared with the example shown in FIG. 6.

Figure 10:
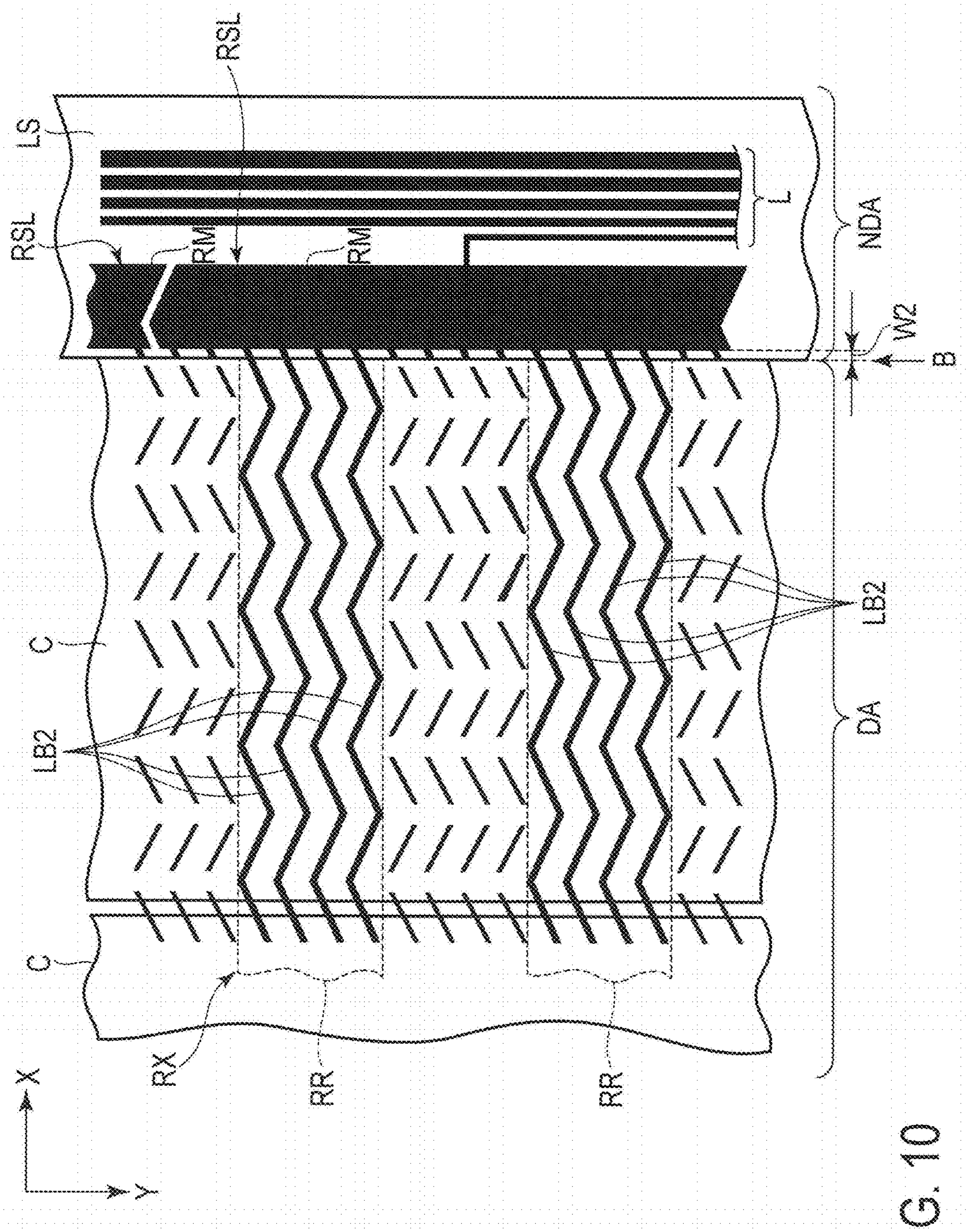
FIG. 10 is yet another plan view enlarging and schematically showing a part of the sensor SE shown in FIG. 5.

FIG. 10 is yet another plan view enlarging and schematically showing a part of the sensor SE shown in FIG. 5. The example shown in FIG. 10 is different from the example shown in FIG. 6 with respect to a feature that the broadened portions RSL of the detection electrode Rx include a strip-shaped metal film RM.

The metal film RM in the broadened portions RSL has a strip shape extending in the second direction Y in the example illustrated, but the shape is not limited to the example illustrated. The broadened portions RSL adjacent in the second direction Y include non-linear end portions which appear to engage with each other. In the example illustrated, each of the broadened portions RSL includes waveform end portions. In other words, a linear gap extending in the first direction X is not formed between the adjacent broadened portions RSL. The metal film RM can be formed of the same metal material as the lead lines L or the body portions RR. The metal film RM is remote from the boundary B between the display area DA and the non-display area NDA and does not extend to the display area DA. For example, an interval W2 in the first direction X between the boundary B and the metal film RM is set in the following manner.

The interval W2 is set to more than or equal to the length of one side of the unit pixel explained with reference to FIG. 4. For example, the unit pixel is a square and the length of a side of the square is 60 μm while the interval W2 is 75 μm.

As another example, the interval W2 is set to more than or equal to a half of the thickness of the second insulating substrate 20. For example, the thickness of the second insulating substrate 20 is 150 μm while the interval W2 is 75 μm.

In such a configuration, the electric field shielding effect of the broadened portions RSL can be further improved and the formation of capacitance between the common electrode CE and the lead lines L through the gap between the body portions RR can be further suppressed, as compared with the example shown in FIG. 9.

In addition, since the strip-shaped metal film RM is remote from the boundary B to the non-display area NDA side, the image displayed in the display area DA can hardly be overlaid visually on the metal film RM and the deterioration in display quality can be suppressed even if the liquid crystal display device DSP is observed in an oblique direction angled with respect to the normal line.

Next, a modified example of the capacitive sensor SE built in the liquid crystal display device DSP of the present embodiment will be explained. A modified example of the shape of the gap between the broadened portions RSL and the lead lines L will be particularly explained. As explained with reference to FIG. 5, the detection electrodes Rx remote from the position of connection with the flexible printed circuit FPC2 are connected with the lead lines L in the non-display area NDA which are remote from the display area DA. Alternatively, the lead lines L may be disposed at positions remote from the display area DA, to suppress the formation of capacitance between the lead lines L and the common electrode CE. In these cases, a gap is formed between the detection electrodes Rx and the lead lines L. An electric field traveling from the common electrode CE to the lead lines L easily leaks in the gap. A modified example hereinafter explained is suitable to the layout in which the detection electrodes Rx and the lead lines L are located at remote positions.

Figure 11:
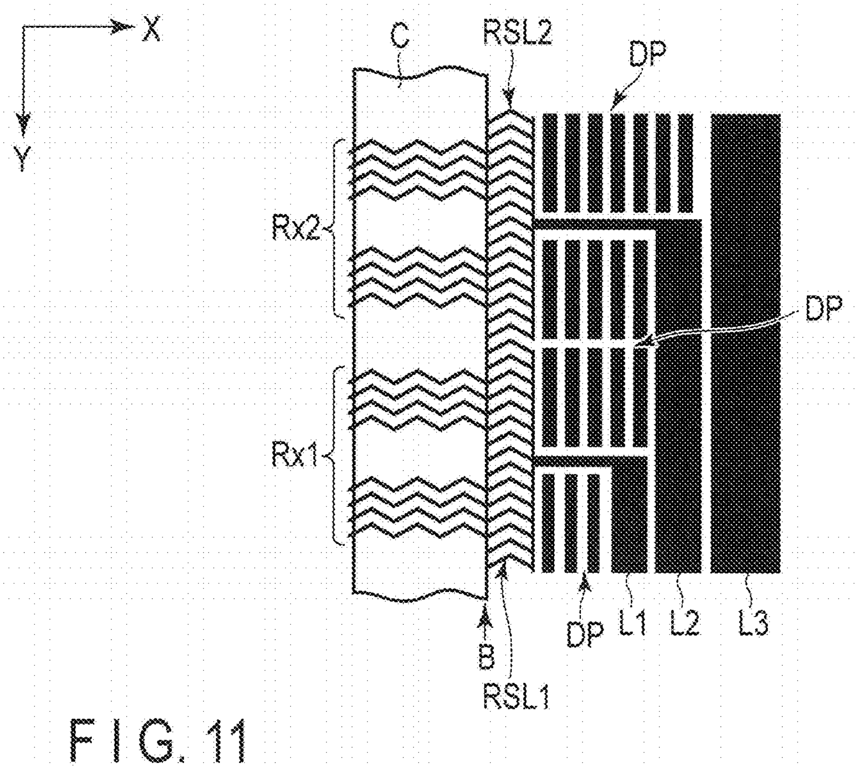
FIG. 11 is yet another plan view enlarging and schematically showing a part of the sensor SE shown in FIG. 5.

FIG. 11 is yet another plan view enlarging and schematically showing a part of the sensor SE shown in FIG. 5. The example shown in FIG. 11 is different from the example shown in FIG. 6 with respect to a feature that dummy electrodes DP in an insular shape are disposed between the broadened portions RSL and the lead lines L. The shapes of the body portions RR and the broadened portions RSL are not limited to those of the example illustrated.

In the drawing, lead lines L1 to L3 are arranged in order in a direction of being remote from the boundary B. A broadened portion RSL1 of a detection electrode Rx1 is connected to the lead line L1 while a broadened portion RSL2 of a detection electrode Rx2 is connected to the lead line L2. The dummy electrodes DP are disposed between the broadened portions RSL1 and RSL2, and between the lead lines L1 to L3. The dummy electrodes DP are shaped in, for example, a rectangle extending in the second direction Y but the shape is not limited to the example illustrated. The dummy electrodes DP can be formed of the same metal material as the lead lines L1 to L3 and the detection electrodes Rx1 and Rx2.

In the example illustrated, three dummy electrodes DP are arranged in the first direction X, between the broadened portion RSL1 and the lead line L1. Five dummy electrodes DP are arranged in the first direction X, between the broadened portion RSL1 and the lead line L2. Seven dummy electrodes DP are arranged in the first direction X, between the broadened portion RSL2 and the lead line L3.

The dummy electrodes DP can block the leakage field from gaps between the detection electrodes Rx1 and Rx2, and the lead lines L1 to L3. For this reason, the same advantage as that explained above can be obtained, the electric field to the other adjacent lead lines (i.e., the lead lines located on the side remote from the boundary B) can also be blocked and the sensor error detection can be suppressed, in the layout in which the detection electrodes and the lead lines are disposed at remote positions.

Figure 12:
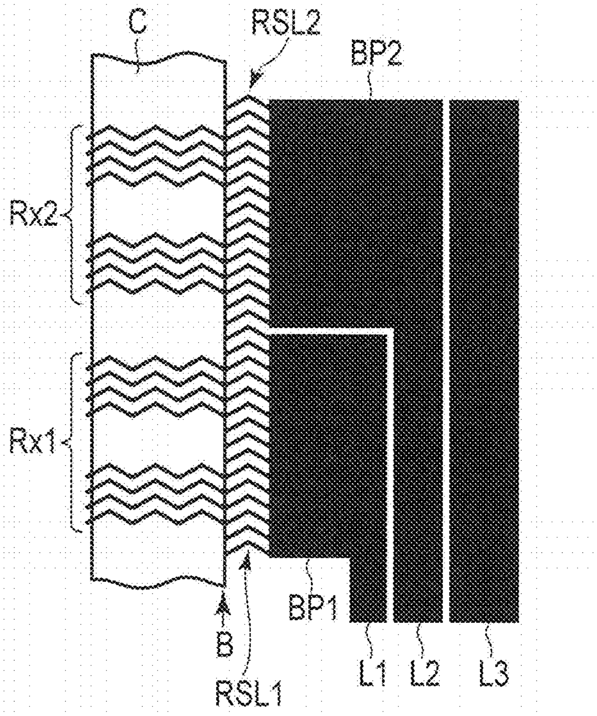
FIG. 12 is yet another plan view enlarging and schematically showing a part of the sensor SE shown in FIG. 5.

FIG. 12 is yet another plan view enlarging and schematically showing a part of the sensor SE shown in FIG. 5. The example shown in FIG. 12 is different from the example shown in FIG. 6 with respect to a feature of comprising planar block electrodes BP which make connection between the broadened portions RSL and the lead lines L.

In the drawing, a block electrode BP1 makes connection between the lead line L1 and the broadened portion RSL1. The block electrode BP2 makes connection between the lead line L2 and the broadened portion RSL2. The block electrodes BP1 and BP2 are formed in a plate-like shape to fill the gaps between the broadened portions RSL1 and RSL2 and the lead lines L1 to L3, but the adjacent block electrodes are remote from each other with a small gap interposed, and adjacent lead lines are remote from each other with a small gap interposed. The block electrodes BP1 and BP2 can be formed of the same metal material as the lead lines L1 to L3 and the detection electrodes Rx1 and Rx2.

The block electrodes BP1 and BP2 can further improve the field shielding effect as compared with the dummy electrodes DP shown in FIG. 11.

Figure 13:
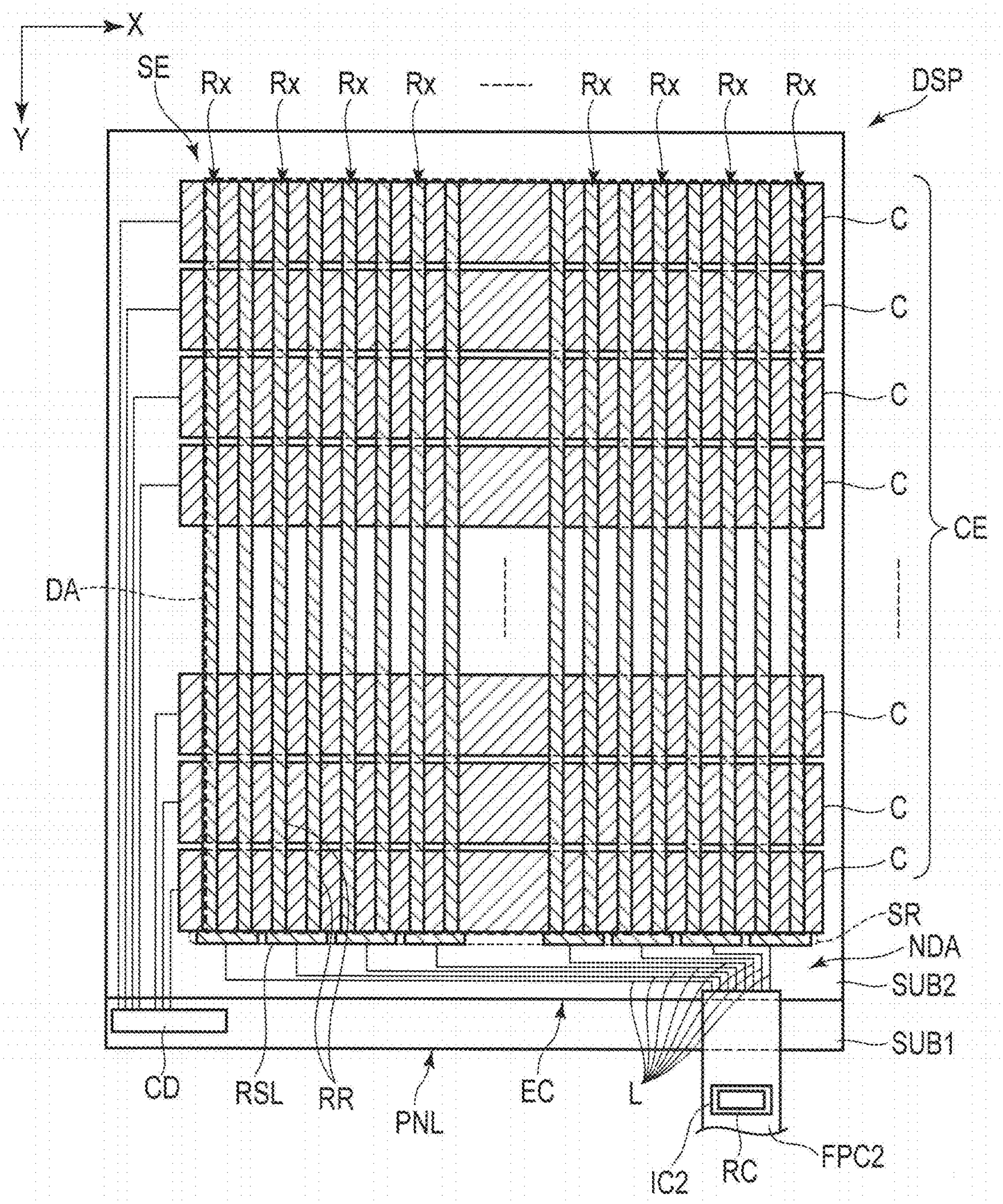
FIG. 13 is a plan view schematically showing another configuration of the sensor SE of the embodiment.

FIG. 13 is a plan view schematically showing another configuration of the sensor SE of the embodiment. The example shown in FIG. 13 differs from the example shown in FIG. 5 with respect to a feature that each of the divisional electrodes C of the common electrode CE extends in the first direction X while the detection electrodes Rx substantially extend in the second direction Y.

In other words, the common electrode CE comprises the divisional electrodes C which are arranged in the second direction Y to be spaced apart from each other and which extend approximately straightforward in the first direction X, in the display area DA. The detection electrodes Rx are arranged in the first direction X to be spaced apart from each other and extend approximately straightforward in the second direction Y, in the display area DA. The common electrode CE and the detection electrodes Rx are opposed so as to sandwich various dielectrics as explained above. Each of the divisional electrodes C is electrically connected to the common electrode drive circuit CD. The lead lines L are disposed in the non-display area NDA to be electrically connected with the detection electrodes Rx in a one-to-one correspondence. The lead lines L are disposed on the second substrate SUB2, similarly to, for example, the detection electrodes Rx. Each of the lead lines Lis electrically connected to the detection electrode RC via the flexible printed circuit FPC2. In the example illustrated, the lead lines L are disposed in the non-display area NDA along a side edge EC of the second substrate SUB2 on which the flexible printed circuit FPC2 is mounted.

Each detection electrode Rx comprises a body portion RR located in the display area DA, and the broadened portion RSL connected to the body portion RR and located in the non-display area NDA alone, similarly to the example shown in FIG. 5, though not described here. In the example illustrated, the broadened portions RSL are arranged in the non-display area NDA extending along side edge EC. The broadened portions RSL of the respective detection electrodes Rx are arranged in the first direction X so as to form the surrounding portion SR between the common electrode CE and the lead lines L. As explained above, the adjacent broadened portions RSL are configured to suppress leakage of the electric field though illustrated simply. In other words, any one of the configurations explained with reference to FIG. 6, FIG. 9 and FIG. 10 can be applied to the detection electrodes Rx, and any one of the configurations explained with reference to FIG. 11 and FIG. 12 can be applied to the gap between the detection electrodes Rx and the lead lines L.

In this modified example, too, the same advantages as those of the above-explained examples can be obtained. In addition, the length of the lead lines L making connection between the detection electrodes Rx and the flexible printed circuit FPC2 can be reduced, and the noise of the lead lines L can be further reduced, as compared with the example shown in FIG. 5 or the like.

The sensor-equipped display device in which the common electrode CE built in the display panel PNL functions as the sensor driving electrode, and the detection electrodes Rx opposed to the sensor driving electrode and the lead lines L electrically connected to the detection electrodes Rx are disposed, has been explained in the embodiment, but the embodiment can also be applied to the sensor devices which can be combined by being applied on the display panel including no sensor elements such as the sensor driving electrode and the detection electrodes. More specifically, the sensor device comprises a sensor panel including a sensor driving electrode, detection electrodes and lead lines, and a driving module. The sensor driving electrode is disposed at a position opposed to the display area of the display device. The detection electrodes are opposed to the sensor driving electrode. The lead lines are disposed at positions opposed to the non-display area of the display device and electrically connected with the detection electrodes to allow the sensor output value to be output from the detection electrodes. The driving module supplies the sensor drive signal to the sensor driving electrode and allows the sensor drive signal from the sensor driving electrode to be detected as the detection signal by the detection electrodes to read variation of the detection signal. In the sensor device, each of the detection electrodes comprises the body portion and the broadened portion wider than the body portion. The body portion is opposed to the sensor driving electrode. The broadened portion is opposed to the non-display area without being opposed to the display area, and is not opposed to the sensor driving electrode either. In this sensor device, too, the same advantages as those of the above-explained embodiments can be obtained.

As described above, the sensor-equipped display device and the sensor device capable of suppressing the sensor error detection can be provided according to the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor device comprising:

electrodes each including first parts arranged in a first direction and a second part connected to the first parts, the first parts each having first metal wires, and the second part having second metal wires, wherein a longitudinal direction of the second part is the first direction, and at least one of the first parts has a first intersection portion at which two of the first metal wires intersect.

2. The sensor device according to claim 1, wherein the second part has a second intersection portion at which two of the second metal wires intersect.

3. The sensor device according to claim 1, wherein detection signals are detected by the electrodes.

4. The sensor device according to claim 1, wherein a longitudinal direction of the first parts is a second direction different from the first direction.

5. The sensor device according to claim 4, wherein at least one of the first parts has a first segment and a second segment which are included in the first metal wires, a longitudinal direction of the first segment is a third direction different from the first and second directions, and a longitudinal direction of the second segment is a fourth direction different from the first to third directions.

6. The sensor device according to claim 4, wherein the second part has a third segment and a fourth segment which are included in the second metal wires, a longitudinal direction of the third segment is a fifth direction different from the first and second directions, and a longitudinal direction of the fourth segment is a sixth direction different from the first direction, the second direction, and the fifth direction.

7. The sensor device according to claim 1, wherein each of the first parts has a strip structure formed of an assembly of the first metal wires.

8. The sensor device according to claim 1, wherein at least one of the first metal wires has a first bent portion.

9. The sensor device according to claim 1, wherein at least one of the second metal wires has a second bent portion.

10. The sensor device according to claim 1, wherein the second metal wires include a first wire which is in physical contact with the first parts, and a longitudinal direction of the first wire is the first direction.

11. The sensor device according to claim 10, wherein the second metal wires include a second wire which is opposed to the first wire, and the second wire is in physical contact with a lead line which connects the second wire with a detection circuit.

12. The sensor device according to claim 1, wherein the second part is connected to a lead line, the second part is between the lead line and the first parts, and the lead line is wider than each of the first and second metal wires.

13. A sensor device comprising:

electrodes each including first parts arranged in a first direction and a second part connected to the first parts, the first parts each having first metal wires, and the second part having second metal wires, wherein a longitudinal direction of the second part is the first direction, and the second part has a second intersection portion at which two of the second metal wires intersect.

14. The sensor device according to claim 13, wherein detection signals are detected by the electrodes.

15. The sensor device according to claim 13, wherein a longitudinal direction of the first parts is a second direction different from the first direction.

16. The sensor device according to claim 15, wherein at least one of the first parts has a first segment and a second segment which are included in the first metal wires, a longitudinal direction of the first segment is a third direction different from the first and second directions, and a longitudinal direction of the second segment is a fourth direction different from the first to third directions.

17. The sensor device according to claim 15, wherein the second part has a third segment and a fourth segment which are included in the second metal wires, a longitudinal direction of the third segment is a fifth direction different from the first and second directions, and a longitudinal direction of the fourth segment is a sixth direction different from the first direction, the second direction, and the fifth direction.

18. An electrode of a sensor comprising:

first parts arranged in a first direction and a second part connected to the first parts, the first parts each having first metal wires, and the second part having second metal wires, wherein a longitudinal direction of the second part is the first direction, and at least one of the first parts has a first intersection portion at which two of the first metal wires intersect.

19. The electrode of the sensor according to claim 18, wherein the second part has a second intersection portion at which two of the second metal wires intersect.

20. The electrode of the sensor according to claim 18, wherein a longitudinal direction of the first parts is a second direction different from the first direction.

* * * * *